US010998937B2

(12) United States Patent
McConnell et al.

(10) Patent No.: US 10,998,937 B2
(45) Date of Patent: May 4, 2021

(54) EMBEDDED TAG FOR RESOURCE DISTRIBUTION

(71) Applicant: BANK OF AMERICA CORPORATION, Charlotte, NC (US)

(72) Inventors: Patrick Thomas McConnell, Huntersville, NC (US); William Bradley Burks, Charlotte, NC (US); Daniel James Doherty, Huntersville, NC (US); Justin Riley duPont, Charlotte, NC (US); Thomas Elliott, Redwood City, CA (US); Tony England, Tega Cay, SC (US); Matthew Murphy, Charlotte, NC (US); Nickolas Patrick Parker, Charlotte, NC (US); Stephen Philip Selfridge, Huntersville, NC (US); Steven Michael Twombly, Saco, ME (US); James J. Williams, Lincoln University, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/399,709

(22) Filed: Apr. 30, 2019

(65) Prior Publication Data
US 2020/0350955 A1 Nov. 5, 2020

(51) Int. Cl.
*H04B 5/00* (2006.01)
*H04W 4/80* (2018.01)
*G06K 7/10* (2006.01)
*G06K 19/07* (2006.01)

(52) U.S. Cl.
CPC ....... *H04B 5/0056* (2013.01); *G06K 7/10297* (2013.01); *G06K 19/0723* (2013.01); *H04W 4/80* (2018.02)

(58) Field of Classification Search
CPC ............. H04B 5/0056; G06K 19/0723; G06K 7/10297; H04W 4/80
USPC .................................................... 340/539.11
See application file for complete search history.

(56) References Cited

U.S. PATENT DOCUMENTS

| 919,598 A | 4/1909 | Kuebler |
| 954,785 A | 4/1910 | Craven |
| 4,613,269 A | 9/1986 | Wilder et al. |
| 4,862,160 A | 8/1989 | Ekchian et al. |
| 5,386,564 A | 1/1995 | Shearer et al. |
| 5,396,630 A | 3/1995 | Banda et al. |
| 5,892,946 A | 4/1999 | Woster et al. |

(Continued)

*Primary Examiner* — Joseph H Feild
*Assistant Examiner* — Sharmin Akhter
(74) *Attorney, Agent, or Firm* — Michael A. Springs; Moore & Van Allen PLLC; James C. Edwards

(57) ABSTRACT

Embodiments of the invention are directed facilitating an electronic resource distribution by embedding a short-range wireless tag in a resource distribution request that stores instructions for processing the resource distribution in a fully electronic processing flow. As such, the resource distribution request holder is capable of processing the request without issuing a resource distribution document to the resource requester. In additional embodiments of the invention, the short-range wireless tag further stores instructions for arranging subsequent resource distributions to the resource requester to occur without the need for the resource requester to present a resource request document.

19 Claims, 8 Drawing Sheets

(56) References Cited

U.S. PATENT DOCUMENTS

| | | | |
|---|---|---|---|
| 5,977,875 A | 11/1999 | Lin et al. | |
| 6,134,559 A | 10/2000 | Brumme et al. | |
| 6,226,792 B1 | 5/2001 | Goiffon et al. | |
| 6,597,801 B1 | 7/2003 | Cham et al. | |
| 6,895,486 B2 | 5/2005 | Wong et al. | |
| 6,918,541 B2 | 7/2005 | Knowles et al. | |
| 6,968,439 B2 | 11/2005 | Wong et al. | |
| 7,346,900 B2 | 3/2008 | Souloglou et al. | |
| 7,362,219 B2 | 4/2008 | Nogami et al. | |
| 7,668,406 B2 | 2/2010 | Schnee et al. | |
| 7,822,688 B2 | 10/2010 | Labrou et al. | |
| 7,844,582 B1 | 11/2010 | Arbilla et al. | |
| 8,117,085 B1 | 2/2012 | Smith | |
| 8,332,272 B2 | 12/2012 | Fisher | |
| 8,346,210 B2 | 1/2013 | Balsan et al. | |
| 8,346,857 B2 | 1/2013 | Denker et al. | |
| 8,352,323 B2 | 1/2013 | Fisher | |
| 8,423,466 B2 | 4/2013 | Lanc | |
| 8,630,905 B2 | 1/2014 | Fisher | |
| 8,662,401 B2 | 3/2014 | Skowronek et al. | |
| 8,705,873 B2 | 4/2014 | Voloshynovskiy et al. | |
| 8,751,313 B2 | 6/2014 | Fisher | |
| 8,751,314 B2 | 6/2014 | Fisher | |
| 8,805,739 B2 | 8/2014 | Brown et al. | |
| 8,864,024 B1 | 10/2014 | Cummins et al. | |
| 9,015,066 B2 | 4/2015 | Scipioni et al. | |
| 9,117,237 B2 | 8/2015 | Levitt et al. | |
| 9,189,783 B2 | 11/2015 | Chowdhury et al. | |
| 9,218,624 B2 | 12/2015 | Moghadam | |
| 9,367,921 B2 | 6/2016 | Boardman et al. | |
| 9,379,841 B2 | 6/2016 | Fine et al. | |
| 9,384,480 B2 | 7/2016 | Jain | |
| 9,396,467 B2 | 7/2016 | Chiang | |
| 9,563,890 B2 | 2/2017 | Zhou | |
| 9,767,442 B2 | 9/2017 | Killian et al. | |
| 9,785,940 B2 | 10/2017 | deOliveira et al. | |
| 9,824,349 B2 | 11/2017 | Xing et al. | |
| 9,824,355 B2 | 11/2017 | Aabye et al. | |
| 9,830,589 B2 | 11/2017 | Xing | |
| 9,836,744 B2 | 12/2017 | Fisher | |
| 9,904,923 B2 | 2/2018 | Mattsson et al. | |
| 9,911,116 B1 | 3/2018 | Lewis et al. | |
| 9,953,308 B2 | 4/2018 | Xing | |
| 9,984,360 B2 | 5/2018 | Jooste | |
| 9,985,699 B1 | 5/2018 | Cronin | |
| 10,083,447 B1 | 9/2018 | Chiarella et al. | |
| 10,127,541 B2 | 11/2018 | Abifaker | |
| 10,128,914 B1 * | 11/2018 | Calabrese | H04L 67/2804 |
| 10,140,603 B2 | 11/2018 | Fisher | |
| 10,152,706 B2 | 12/2018 | Caceres et al. | |
| 2009/0043681 A1 | 2/2009 | Shoji et al. | |
| 2010/0211504 A1 | 8/2010 | Aabye et al. | |
| 2011/0320293 A1 | 12/2011 | Khan | |
| 2012/0303496 A1 * | 11/2012 | Musfeldt | G06Q 40/00 705/34 |
| 2013/0134216 A1 | 5/2013 | Spodak et al. | |
| 2014/0136405 A1 | 5/2014 | DuCharme et al. | |
| 2014/0214678 A1 | 7/2014 | Williams et al. | |
| 2014/0256251 A1 | 9/2014 | Caceres et al. | |
| 2016/0055513 A1 | 2/2016 | Kuhn et al. | |
| 2016/0164680 A1 | 6/2016 | Liao et al. | |
| 2016/0307186 A1 | 10/2016 | No et al. | |
| 2017/0169422 A1 | 6/2017 | Ye et al. | |
| 2017/0185993 A1 | 6/2017 | Sawant et al. | |
| 2017/0255920 A1 | 9/2017 | Prakash et al. | |
| 2017/0262822 A1 | 9/2017 | Conyers | |
| 2017/0262832 A1 | 9/2017 | Deshpande et al. | |
| 2017/0352035 A1 | 12/2017 | Geraud | |
| 2017/0364895 A1 | 12/2017 | Van Heerden et al. | |
| 2017/0372289 A1 | 12/2017 | Fitzsimmons et al. | |
| 2018/0025348 A1 | 1/2018 | Shauh et al. | |
| 2018/0204195 A1 | 7/2018 | Kang | |
| 2018/0211248 A1 | 7/2018 | Sims et al. | |
| 2018/0315048 A1 | 11/2018 | Xiu et al. | |
| 2019/0009168 A1 | 1/2019 | Aman et al. | |
| 2019/0042816 A1 | 2/2019 | McQuade et al. | |
| 2019/0095925 A1 | 3/2019 | Gabriele et al. | |
| 2019/0199714 A1 | 6/2019 | Kamal et al. | |
| 2020/0092087 A1 | 3/2020 | Hillan et al. | |
| 2020/0302436 A1 | 9/2020 | Ilincic et al. | |

* cited by examiner

EMBEDDED TAG FOR RESOURCE DISTRIBUTION

FIELD OF THE INVENTION

The present invention is generally directed to electronic resource distribution and, more specifically, facilitating a resource distribution by embedding a short-range wireless tag/chip, such as a Near-Field Communication (NFC) tag or the like within a resource distribution request document that stores instructions for processing the resource distribution in a fully electronic manner.

BACKGROUND

Many resource distributions are conducted in a conventional fashion in which a resource requester/recipient presents a physical resource distribution request document to the resource provider and, in turn, the resource provider issues a physical resource distribution document configured to authorize distribution of the resources.

However, a need exists to develop systems, apparatus computer program products, methods or the like that eliminate the need for the resource requester/recipient to present a resource distribution request and/or for the resource provider to issues a physical resource distribution document configured to authorize distribution of the resources. A further need exists to provide a fully automated means for the resource requester/recipient and/or resource provider to transition from the use of physical document exchange, such that, subsequent resource distributions are conducted in a fully electronic manner absent the need to exchange physical resource distribution request and resource e distribution documents.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for facilitating a fully electronic resource distribution by embedding a short-range wireless tag/chip, such as a Near-Field Communication (NFC) tag or the like in a resource distribution request that stores instructions for processing the resource distribution in a fully electronic manner. The holder (i.e., resource provider) of the resource distribution request uses a mobile communication device having a short-range wireless receiver, such as a NFC reader to read the instructions. In specific embodiments of the invention, the instructions may provide for launching an application of the mobile communication device that automates the completion of the electronic resource distribution. While in other embodiments of the invention, the instructions may provide for loading the resource distribution request in a resource distribution application or online portal for resource provider to authorize the electronic resource distribution. As such, the holder (i.e., resource provider) of the resource distribution request is able to process the resource distribution without having to issue a conventional resource distribution document that authorizes the distribution of resources to the resource requester.

In additional embodiments of the invention, the instructions additionally provide for requesting that the holder (i.e., resource provider) of the resource distribution request authorize or automatically authorizing and arranging for subsequent requests for resource distribution to occur absent issuance of a physical document requesting resource distribution. In this regard, the instructions may provide for the mobile device to present different options to the user for making subsequent resource distributions to the resource requester (i.e., auto resource distribution, including, in some embodiments, real-time payment, load the request in resource distribution app/online portal or the like) or, in other embodiments of the invention, the instructions themselves may be configured such that subsequent resource distribution requests are set-up for automatic electronic resource distribution or loading of the request within a resource distribution app/online portal or the like.

A system for facilitating resource distribution defines first embodiments of the invention. The system includes a physical document having indicia configured to request a resource distribution. The system additionally includes a short-range wireless tag/chip, such as a Near-Field Communication (NFC) tag or the like embedded within the physical document. The a short-range wireless tag/chip stores first instructions for at least one of requesting electronic processing of the resource distribution or completing electronic processing of the resource distribution. The system additionally includes a mobile communication device that includes a memory, a processor in communication with the memory and a short-range wireless receiver, such as a NFC reader in communication with the processor. The short-range wireless receiver is configured to, in response to the mobile communication device being within a prescribed near-field distance of the a short-range wireless tag/chip, read the first instructions for at least one of requesting electronic processing of the resource distribution or completing electronic processing of the resource distribution.

In specific embodiments of the system, the processor of the mobile communication device is further configured to, in response to the short-range wireless receiver reading the first instructions for completing electronic processing of the resource distribution, launch an application that completes electronic processing of the resource distribution. In other related embodiments of the system, the processor of the mobile communication device is further configured to, in response to the short-range wireless receiver reading the first instructions for completing electronic processing of the resource distribution, generate and provide an alert to the user of the mobile communication device that is configured to prompt the user to launch an application that completes electronic processing of the resource distribution.

In other specific embodiments of the system, the processor of the mobile communication device is configured, in response to the short-range wireless reading the instructions for requesting electronic processing of the resource distribution, load a request for electronic processing of the resource distribution in a resource distribution application. In such embodiments of the system, the processor may be further configured to generate and provide an alert to the user that is configured to indicate that the request for electronic processing of the resource distribution is loaded in the resource distribution application.

In still further specific embodiments of the system, the a short-range wireless tag/chip, such as a Near-Field Communication (NFC) tag or the like stores second instructions for requesting that a user of the mobile communication device arrange subsequent requests for resource distribution to occur absent issuance of a physical document requesting resource distribution. In such embodiments of the system, the short-range wireless receiver is configured to, in response to the mobile communication device being within a prescribed short-range distance of the short-range wireless tag/chip, read the second instructions for requesting that the user of the mobile communication device arrange subsequent requests for resource distribution to occur absent issuance of a physical document requesting resource distribution and the processor is configured to generate and provide an alert to the user that includes information for arranging the subsequent requests for resource distribution to occur absent issuance of a physical document requesting resource distribution.

In still further specific embodiments of the system, the short-range wireless tag/chip, such as a NFC tag or the like stores second instructions for configuring subsequent requests for resource distribution to occur automatically (i.e., without user intervention) absent issuance of a physical document requesting resource distribution. In such embodiments of the system, the short-range wireless reader is configured to, in response to the mobile communication device being within a prescribed near-field distance of the short-range wireless tag/chip, read the second instructions for configuring subsequent requests for resource distribution to occur automatically via fully electronic processing and the processor is configured to perform actions for setting up automatic resource distribution for subsequent requests for resource distribution.

An apparatus for facilitating resource distribution defines second embodiments of the invention. The apparatus includes a physical document having indicia configured to request a resource distribution. The apparatus further includes a short-range wireless tag/chip, such as an NFC tag or the like embedded within the physical document and storing store first instructions for at least one of requesting electronic processing of the resource distribution or completing electronic processing of the resource distribution.

In specific embodiments of the apparatus, the short-range wireless tag/chip stores second instructions for requesting that a user of the mobile communication device arrange subsequent requests for resource distribution to occur absent issuance of a physical document requesting resource distribution. While in other specific embodiments of the apparatus, the short-range wireless tag/chip stores second instructions for store second instructions for configuring subsequent requests for resource distribution to occur automatically via fully electronic processing.

A method for facilitating resource distribution defines third embodiments of the invention. The method includes embedding a short-range wireless tag/chip, such as a Near-Field Communication (NFC) tag or the like in a physical document having indicia configured to request a resource distribution and storing on the short-range wireless tag/chip, first instructions for at least one of requesting electronic processing of the resource distribution or completing electronic processing of the resource distribution. The method further includes, in response to the short-range wireless tag/chip being within a prescribed near-field distance to a short-range wireless receiver within a mobile communication device, reading, by the short-range wireless receiver, the first instructions for at least one of requesting electronic processing of the resource distribution or completing electronic processing of the resource distribution.

In further specific embodiments the method includes, in response to the short-range wireless receiver reading the first instructions for completing electronic processing of the resource distribution, launching, by a computing device processor within the mobile communication device, an application that completes electronic processing of the resource distribution. In other related embodiments the method includes, in response to the short-range wireless receiver reading the first instructions for completing electronic processing of the resource distribution, generating and providing, by a computing device processor in the mobile communication device, an alert to the user of the mobile communication device that is configured to prompt the user to launch an application that completes electronic processing of the resource distribution.

In still further specific embodiments of the method includes, in response to the short-range wireless receiver reading the instructions for requesting electronic processing of the resource distribution, loading, by a computing device processor in the mobile communication device, a request for electronic processing of the resource distribution in a resource distribution application and generating and providing, by the computing device processor, an alert to the user that is configured to indicate that the request for electronic processing of the resource distribution is loaded in the resource distribution application.

In other specific embodiments of the method storing further includes storing, on the short-range wireless tag/chip, second instructions for requesting that a user of the mobile communication device arrange subsequent requests for resource distribution to occur absent issuance of a physical document requesting resource distribution. In such embodiments the method may further include, in response to the mobile communication device being within the prescribed near-field distance of the short-range wireless tag/chip, reading, by the short-range wireless receiver, the second instructions for requesting that the user of the mobile communication device arrange subsequent requests for resource distribution to occur absent issuance of a physical document requesting resource distribution and generating and providing, by a computing device processor in the mobile communication device, an alert to the user that includes information for arranging the subsequent requests for resource distribution to occur absent issuance of a physical document requesting resource distribution.

Moreover, in other specific embodiments of the method storing further comprises storing, on the short-range wireless tag/chip, second instructions for configuring subsequent requests for resource distribution to occur automatically via fully electronic processing. In such embodiments the method may further include, in response to the mobile communication device being within a prescribed near-field distance of the short-range wireless tag/chip, reading, by the short-range wireless receiver, the second instructions for configuring subsequent requests for resource distribution to occur automatically via fully electronic processing and performing, by a computing device processor in the mobile communication device, actions for setting up automatic resource distribution for subsequent requests for resource distribution.

Thus, according to embodiments of the invention, which will be discussed in greater data below, the present invention provides for facilitating an electronic resource distribution by embedding a short-range wireless tag/chip, such as a Near-Field Communication (NFC) tag or the like in a resource distribution request that stores instructions for processing the resource distribution in a fully electronic manner. As such, the resource distribution request holder is capable of processing the request without issuing a resource distribution document to the resource requester. In additional embodiments of the invention, the short-range wireless tag/chip further stores instructions for arranging subsequent resource distributions to the resource requester to occur without the need for the resource requester to present a resource request document. As such the present invention eliminates the need for a resource provider to issue a physical resource distribution document/instrument and/or the need for the resource requester to present a resource distribution request for future resource distributions between the resource requester and resource provider.

The features, functions, and advantages that have been discussed may be achieved independently in various embodiments of the present invention or may be combined with yet other embodiments, further data of which can be seen with reference to the following description and drawings.

BRIEF DESCRIPTION OF THE DRAWINGS

Figure 1:
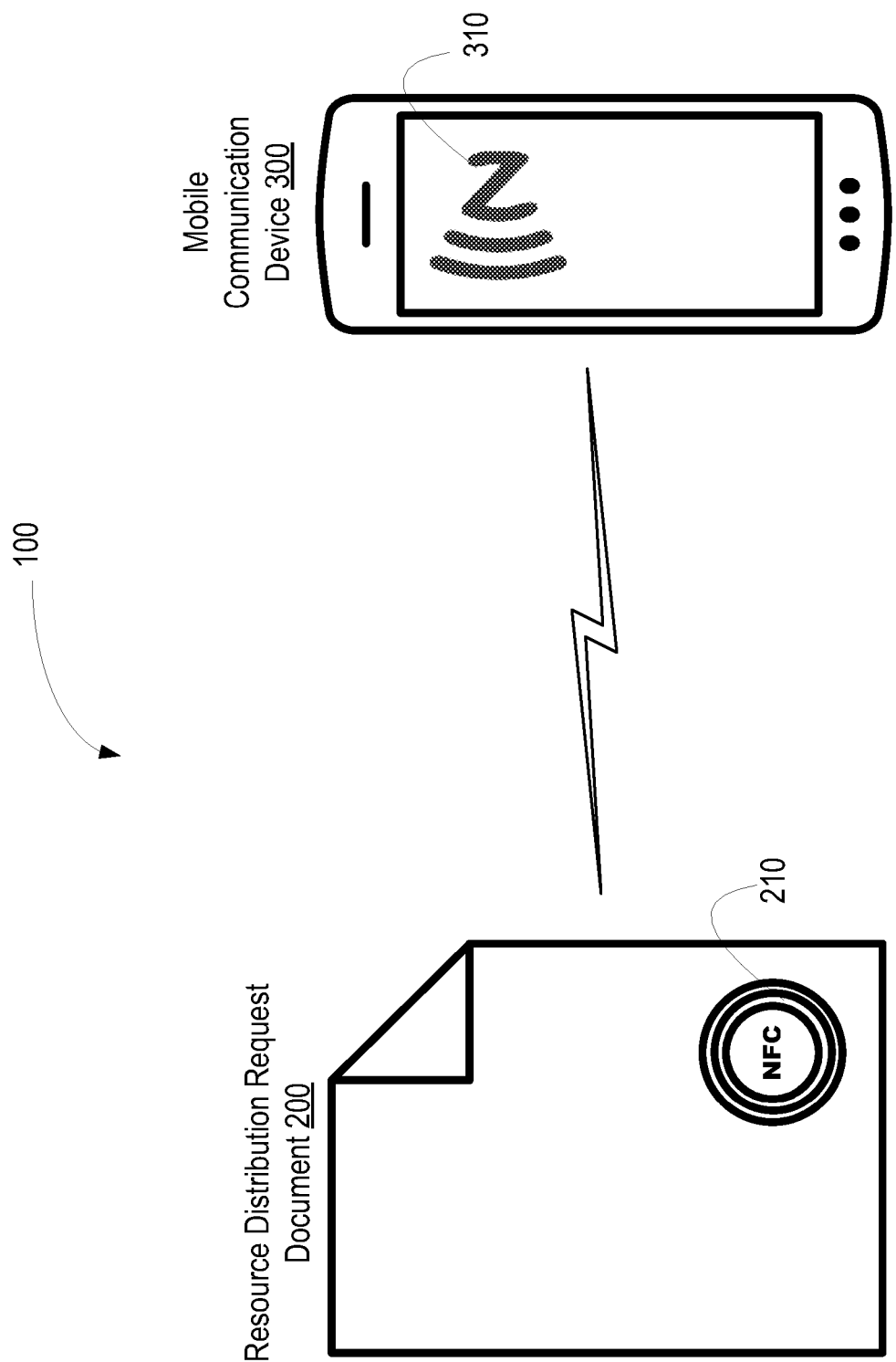
Figure 2:
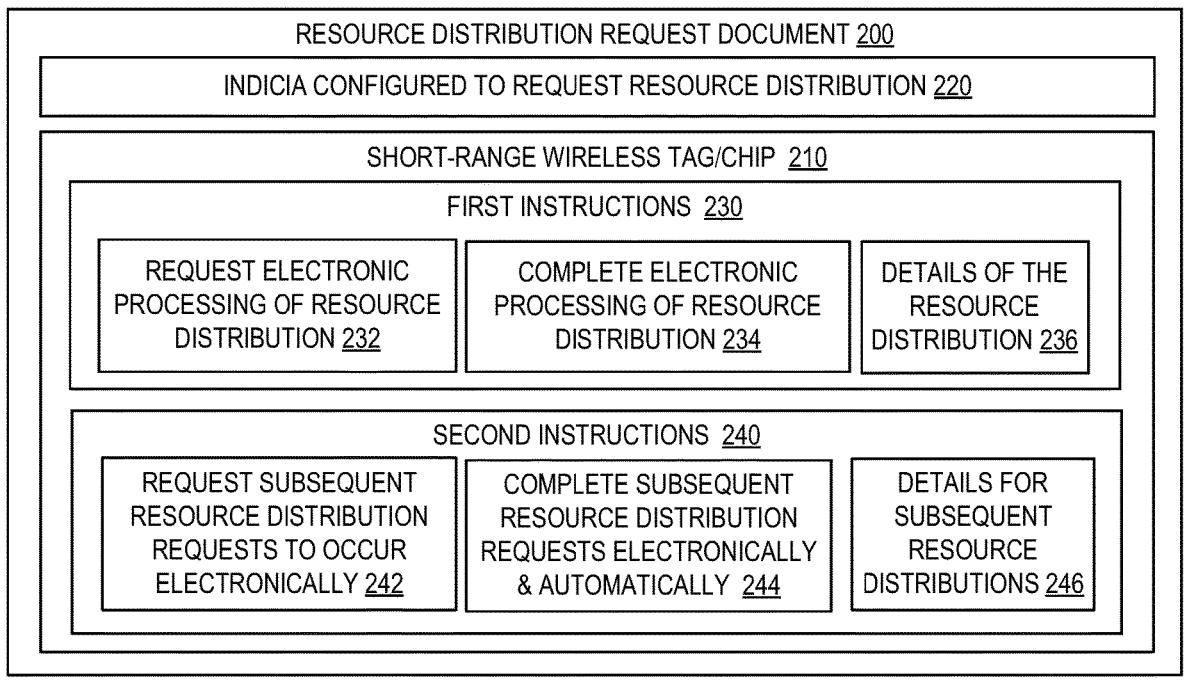
Figure 3:
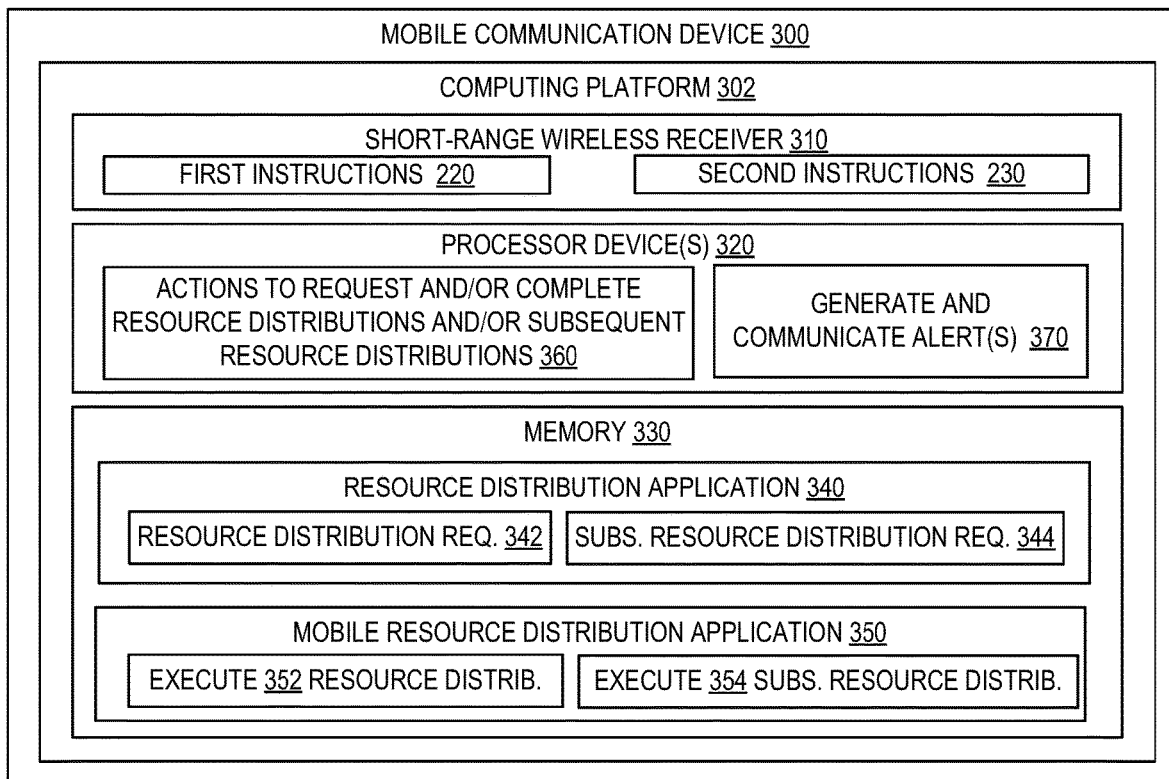
Figure 4:
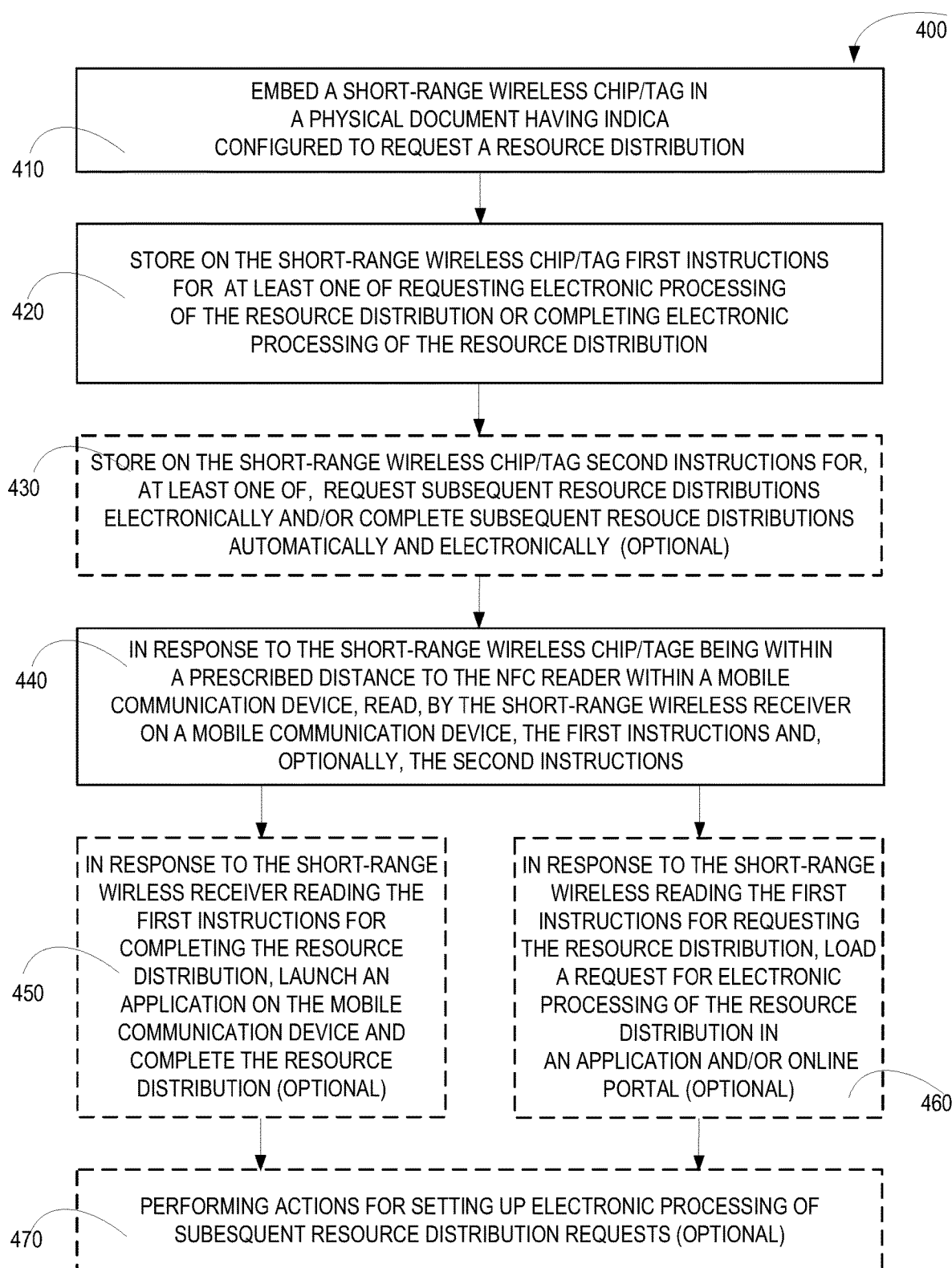
Figure 5:
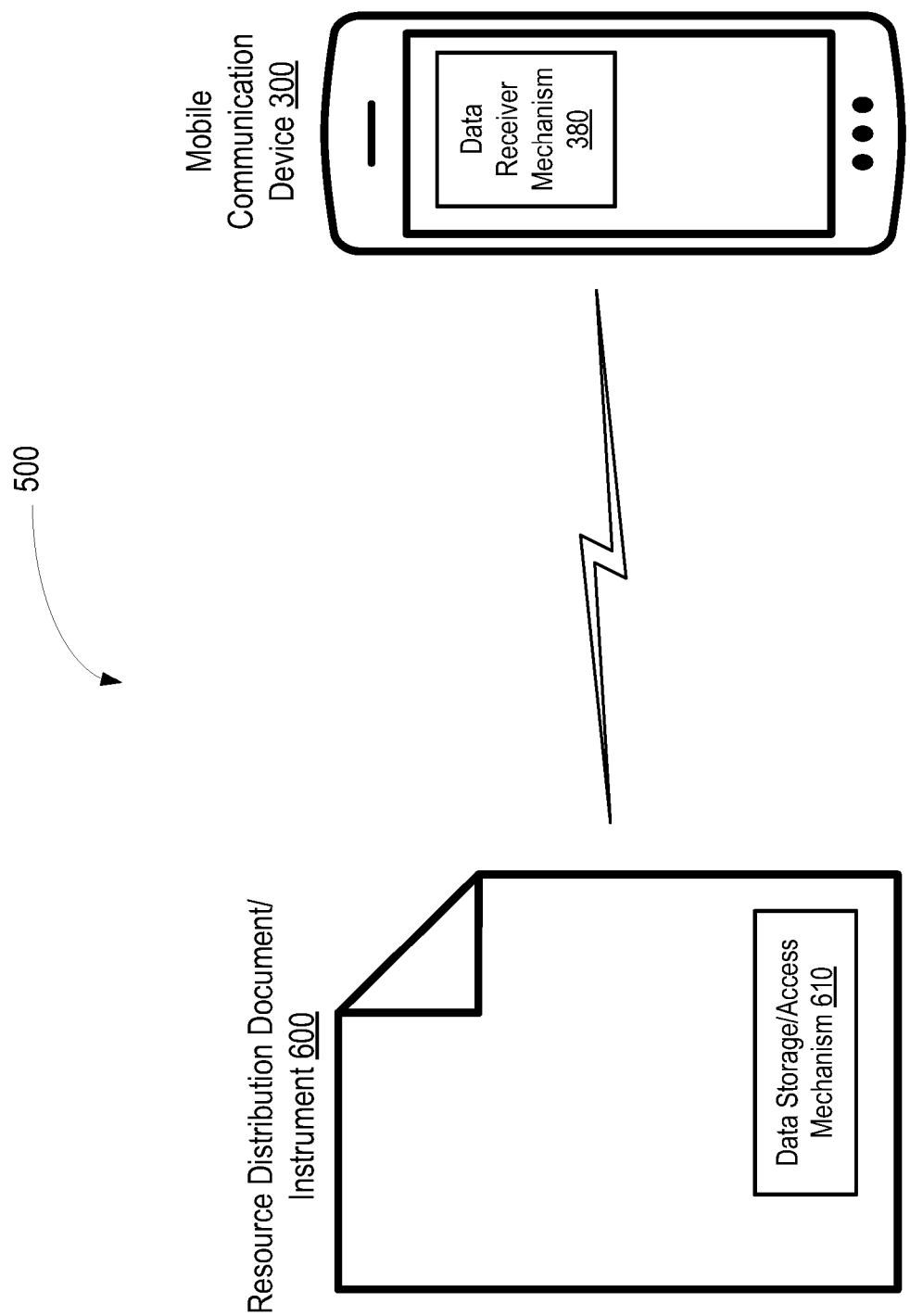
Figure 6:
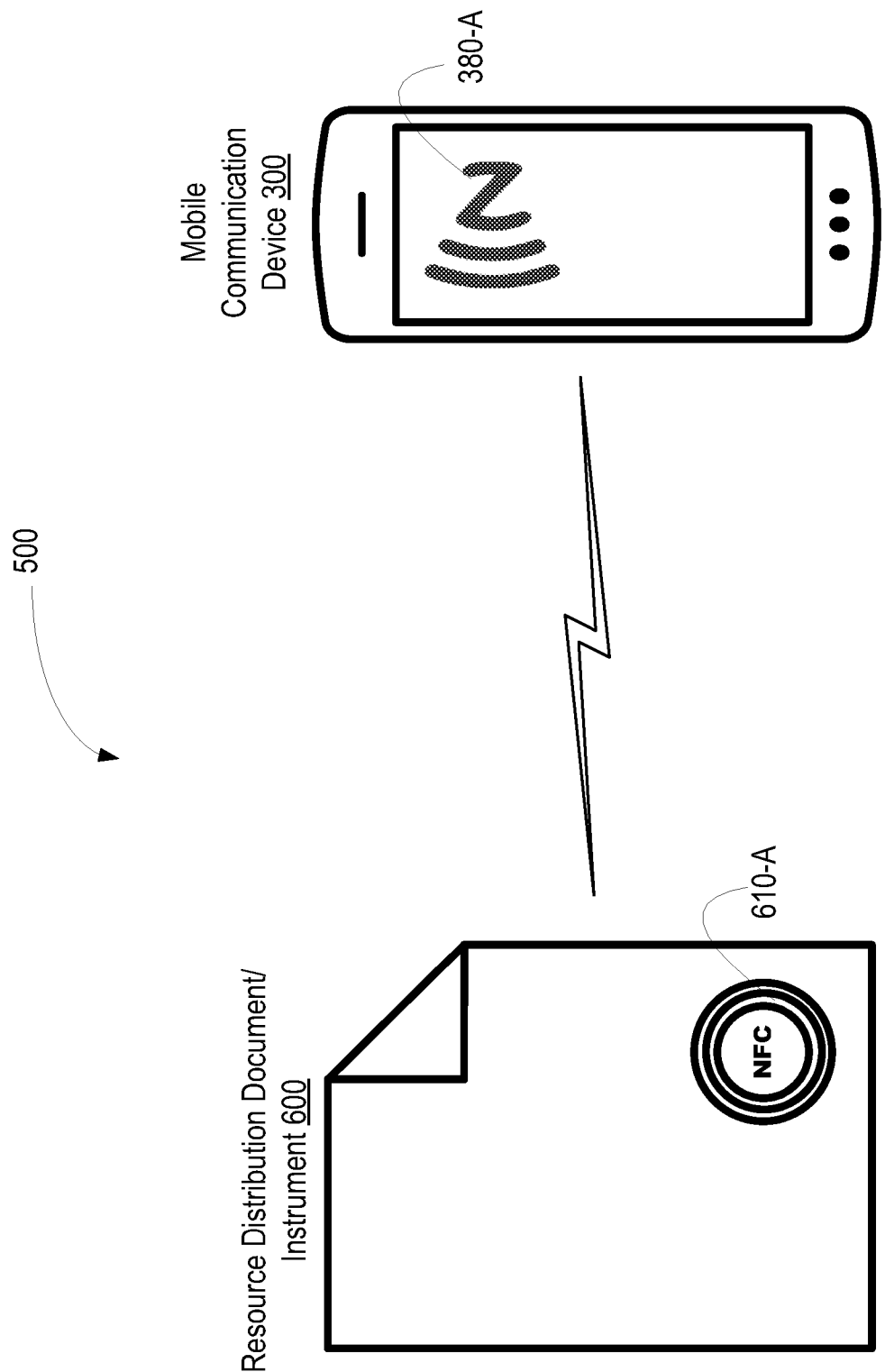
Figure 7:
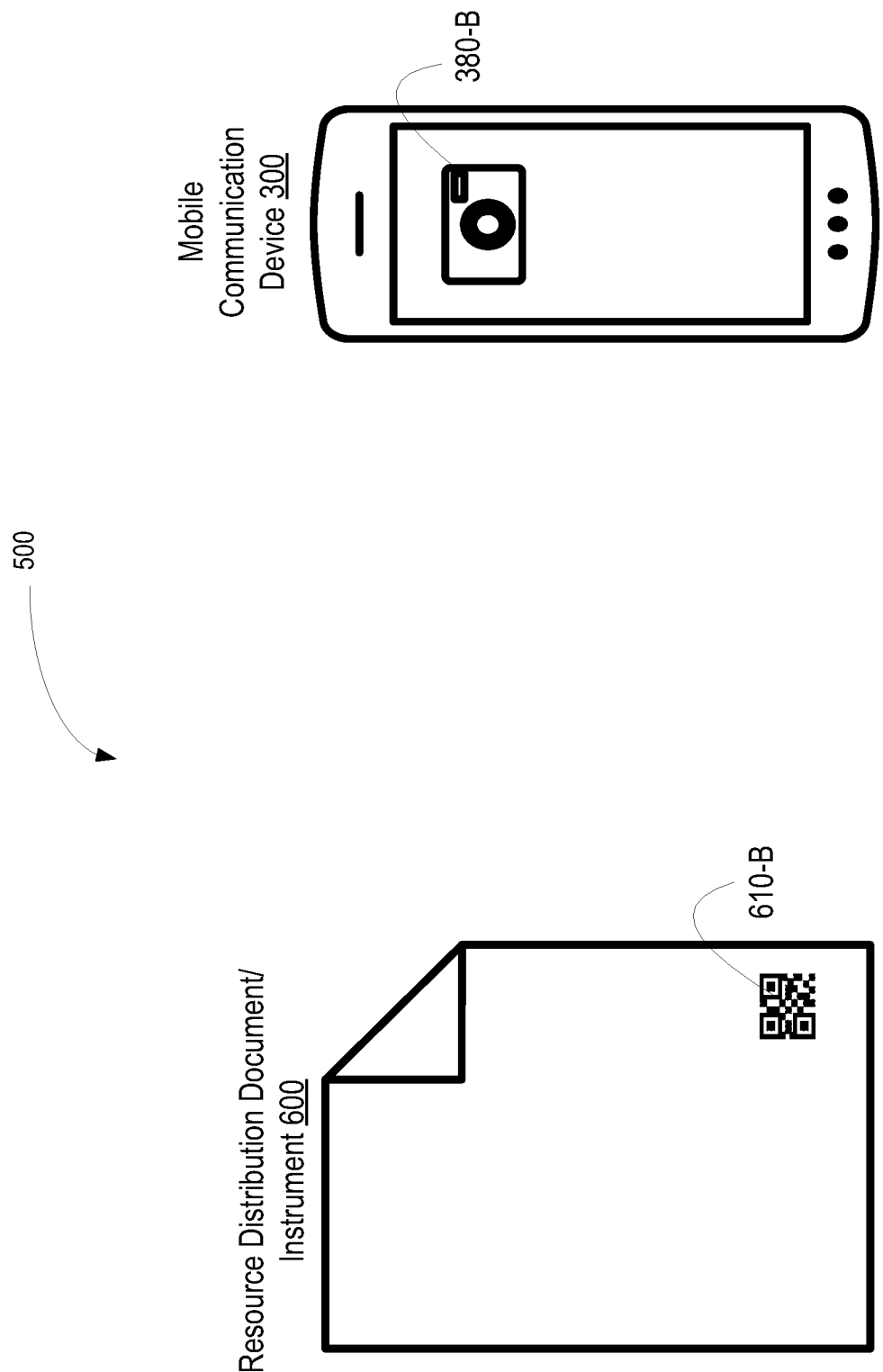
Figure 8:
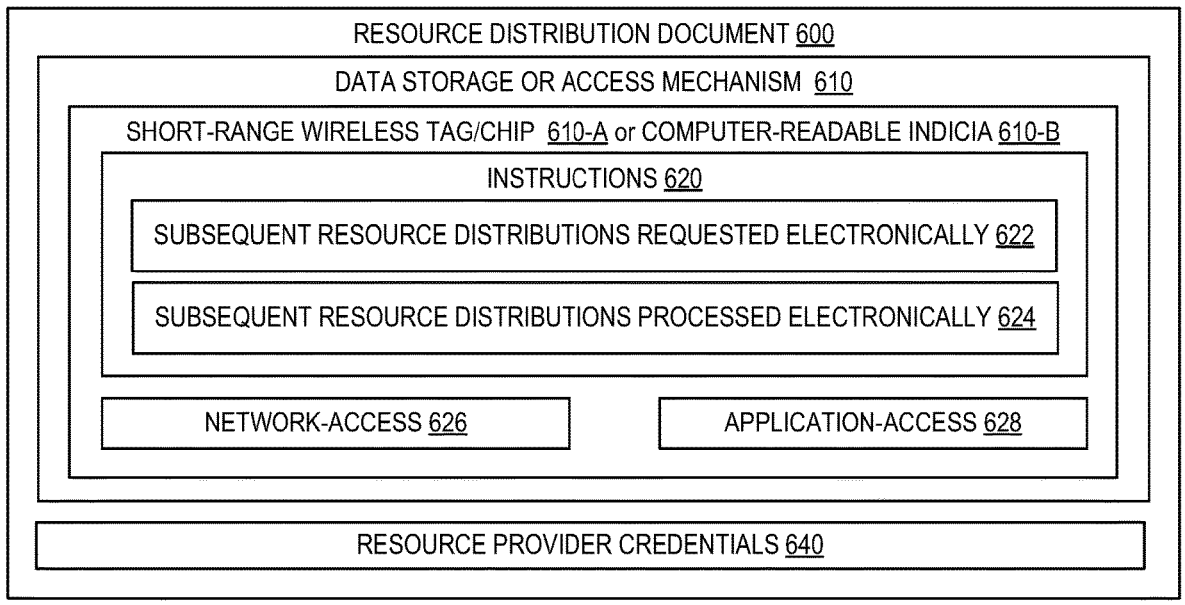
Figure 9:
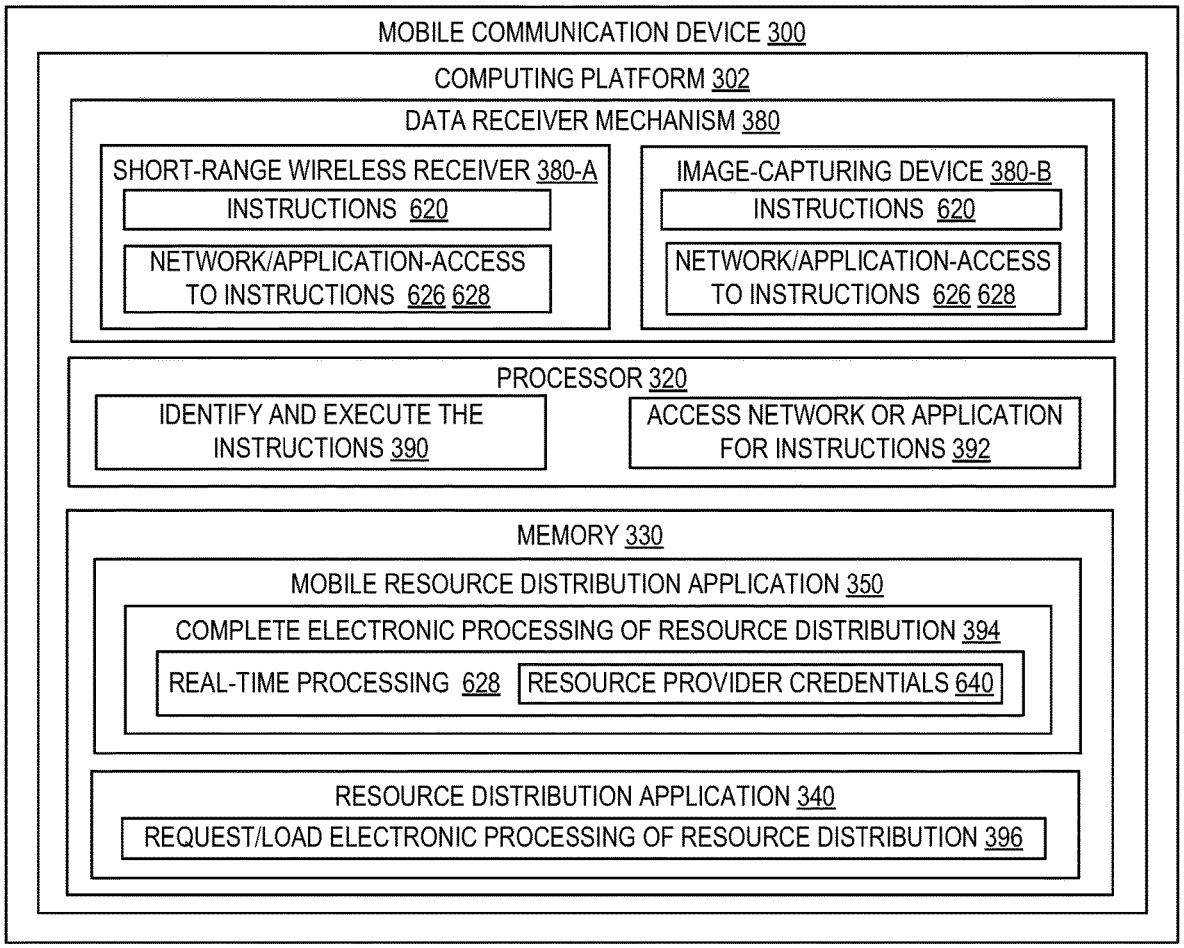
Figure 10:
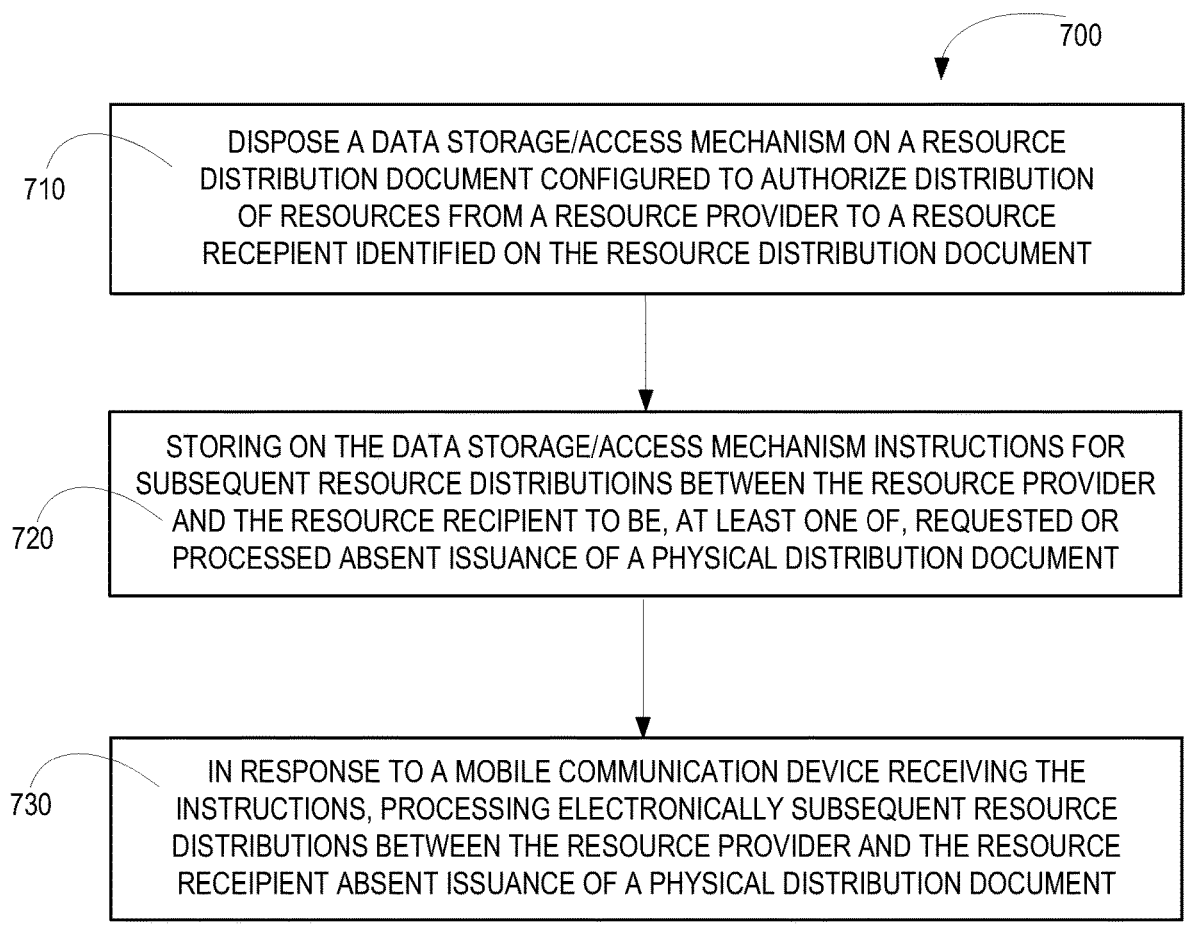

Having thus described embodiments of the disclosure in general terms, reference will now be made to the accompanying drawings, wherein:

FIG. 1 is a block diagram of a system for facilitating resource distribution by embedding a short-range wireless tag/chip in a resource distribution request document, in accordance with some embodiments of the present disclosure;

FIG. 2 is a block diagram of a resource distribution request document having an embedded short-range wireless tag/chip storing instructions for requesting or completing electronic resource distribution, in accordance with embodiments of the present invention;

FIG. 3 is a block diagram of a mobile communication device configured for reading the short-range wireless tag/chip from the resource distribution request document and implementing the instructions thereon, in accordance with embodiments of the present invention;

FIG. 4 is a flow diagram of a method for facilitating resource distribution by embedding a short-range wireless tag/chip in a resource distribution request document, in accordance with embodiments of the present invention;

FIG. 5 is a block diagram of a system for facilitating resource distribution by disposing a data storage/access mechanism or a resource distribution document/instrument, in accordance with embodiments of the present invention;

FIG. 6 is a block diagram of a system for facilitating resource distribution in which the data storage/access mechanism is a short-range wireless tag/chip embedded in the resource distribution document/instrument, in accordance with embodiments of the present invention;

FIG. 7 is a block diagram of a system for facilitating resource distribution in which the data storage/access mechanism is computer-readable indicia/code disposed on the resource distribution document/instrument, in accordance with embodiments of the present invention;

FIG. 8 is a block diagram of a resource distribution document having a data storage/access mechanism disposed thereon storing or providing access to instructions for requesting or completing subsequent resource distribution electronically, in accordance with embodiments of the present invention;

FIG. 9 is a block diagram of a mobile communication device configured for accessing or receiving the instructions from the resource distribution document and executing the instructions to request or complete subsequent resource distributions electronically, in accordance with embodiments of the present invention;

FIG. 10 is flow diagram of a method for facilitating resource distribution by disposing a data storage/access mechanism on a resource distribution document/ledger, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in data below for facilitating a fully electronic resource distribution by embedding a short-range wireless chip/tag, such as a Near-Field Communication (NFC) tag in a resource distribution request that stores instructions for processing the resource distribution in a fully electronic manner. The holder (i.e., resource provider) of the resource distribution request uses a mobile communication device having an short-range wireless receiver, such as a NFC reader or the like to receive/read the instructions. In specific embodiments of the invention, the instructions may provide for launching an application of the mobile communication device that automates the completion of the electronic resource distribution. While in other embodiments of the invention, the instructions may provide for loading the resource distribution request in a resource distribution application or online portal for resource provider to authorize the electronic resource distribution. As such, the holder (i.e., resource provider) of the resource distribution request is able to process the resource distribution without having to issue a conventional resource distribution document that authorizes the distribution of resources to the resource requester.

In additional embodiments of the invention, the instructions additionally provide for requesting that the holder (i.e., resource provider) of the resource distribution request authorize or automatically authorizing and arranging for subsequent requests for resource distribution to occur absent issuance of a physical document requesting resource distribution. In this regard, the instructions may provide for the mobile device to present different options to the user for making subsequent resource distributions to the resource requester (i.e., auto resource distribution, including, in some embodiments, real-time payment, load the request in resource distribution app/online portal or the like) or, in other embodiments of the invention, the instructions themselves may be configured such that subsequent resource distribution requests are set-up for automatic electronic resource distribution or loading of the request within a resource distribution app/online portal or the like.

FIG. 1 illustrates a block diagram of a system 100 for facilitating resource distribution, in accordance with an embodiment of the invention. The system includes a physical resource distribution request document 200 having indicia thereon configured to request a resource distribution between a resource provider and a resource recipient. In specific embodiments of the invention, the physical resource distribution request document 200 is a hard-copy bill or other physical document that requests that payor (i.e., resource provider) submit payment to a payee (i.e., resource recipient).

The system additionally includes a short-range wireless tag/chip, such as a Near-Field Communication (NFC) tag 210 embedded within the physical resource distribution request document 200 that stores instructions configured to, at least one of, (i) request electronic processing of the resource distribution and/or (ii) complete electronic processing of the resource distribution. In those embodiments of the invention, in which the resource distribution request document 200 is a hard-copy bill or the like, the instructions include the details of the bill, such as a bill identifier, payee identifier, payment amount and the like. In such embodiments of the invention, instructions configured to request electronic processing of the resource distribution may include instructions configured to load a payment request for the associated bill in a mobile wallet/banking application or online portal/online banking site. In further such embodiments of the invention, instructions configured to complete electronic processing of the resource distribution may include instructions configured to launch an automatic bill pay application and complete a payment transaction.

Additionally, the system includes a mobile communication device 300 including a short-range wireless receiver 310 configured to, in response to the mobile communication being within a prescribed near-field distance/range of the short-range wireless tag/chip, read the instructions configured to, at least one of (i) request electronic processing of the resource distribution and/or (ii) complete electronic processing of the resource distribution. Additionally, in specific embodiments of the system, mobile communication device includes a processing device (shown in FIG. 3) that is configured to execute the instructions. In those embodiments of the system in which the resource distribution request document is a hard-copy bill or other payment request document executing the instructions to request bill payment may include loading a payment request for the bill in digital wallet/banking application and/or within an online portal/financial institution website having a bill pay feature or the like. In other related embodiments of the system, executing the instructions to complete bill payment may include launching a payment application in the mobile communication device and completing a payment transaction.

Referring to FIG. 2 a more detailed block diagram is presented of a physical resource distribution request document 200, in accordance with embodiments of the invention. The physical resource distribution request document 200, which in specific embodiments of the invention may comprise a hard-copy bill of payment, includes human-readable indicia 220 configured to request a resource distribution between a resource requester and a resource recipient. As previously discussed in relation to FIG. 1, the physical resource distribution request document 200 includes a short-range wireless tag/chip, such as a Near-Field Communication (NFC) tag 210 embedded within the document. The physical resource distribution request document 200 may additionally include other human-readable indicia configured to provide a context for the instructions 230 and/or 240 stored on the short-range wireless tag/chip 210, so that the resource provide in possession of the resource distribution request document is aware of what actions occur upon reading the short-range wireless tag/chip 210.

The short-range wireless tag/chip 210 stores first instructions 230 configured to, at least one of, (i) request 232 electronic processing of the resource distribution and/or (ii) complete 234 electronic processing of the resource distribution. In addition, the first instructions 220 include details 236 of the resource distribution. In those embodiments of the invention, in which the resource distribution request document 200 is a hard-copy bill or the like, the details 236 may include details of the bill, such as a bill identifier, payee identifier, payment amount and the like. In those embodiments of the invention in which the first instructions 220 are configured to request 232 electronic processing of the resource distribution and the document 220 is a bill of payment, the instructions 220 may be configured to load a payment request for the associated bill in a mobile wallet/banking application or online portal/online banking site. In those embodiments of the invention in which the first instructions 220 are configured to complete 234 electronic processing of the resource distribution, the instructions 220 may be configured to launch an automatic bill pay application and complete a payment transaction.

Additionally the short-range wireless tag/chip 210 may store second instructions 240 configured to, at least one (i) request 242 subsequent resource distribution requests occur electronically (i.e., without issuing a physical resource distribution request document) and/or (ii) complete 244 subsequent resource distributions electronically and automatically. In addition, the second instructions include details 246 for requesting/completing subsequent resource transactions, such as, but not limited to, resource requester storage location and the like. In those embodiments of the invention in which the resource distribution request document 200 is a hard-copy bill of payment, the second instructions 240 configured to request 242 subsequent resource distribution requests occur electronically may include instructions for loading subsequent payment requests in a digital wallet/bill pay application and/or an online portal/financial institution website and notifying the payee of such a request (e.g., email, SMS/text alert or the like). Such a request is thus made absent the issuance of a hard-copy bill of payment to the payee (i.e., no need to mail a bill of payment to the payee). In those embodiments of the invention in which the resource distribution request document 200 is a hard-copy bill of payment, the second instructions 240 configured to complete subsequent resource distribution requests electronically and automatically may include instructions for configuring a digital wallet/bill pay application to automatically, upon receipt of a subsequent electronic bill, conduct a payment transaction for the subsequent electronic bill. The automated payment may occur via any known or future known means, including but not limited to Peer-To-Peer (P2P) payment, Real Time Payment (RTP) network, in which the payment to the payee and the settlement of the payment transaction occur in real-time or the like.

FIG. 3 provides a more detailed block diagram of a mobile communication device 300 configured for facilitating resource distribution, in accordance with embodiments of the invention. The mobile communication device 300 includes a computing platform 302 configured to execute programs, applications, modules and the like. The computing platform 302 includes memory 330, which may comprise volatile and non-volatile memory, such as read-only and/or random-access memory (RAM and ROM), EPROM, EEPROM, flash cards, or any memory common to computer platforms). Moreover, memory 330 may comprise cloud storage accessible to the mobile communication device 300, such as provided by a cloud storage service and/or a cloud connection service.

Further, computing platform 302 also includes one or more processor devices 320, which may be an application-specific integrated circuit ("ASIC"), or other chipset, logic circuit, or other data processing device. Processor device 320 may execute an application programming interface ("API") (not shown in FIG. 3) that interfaces with any resident instructions, such as instructions 230 and/or 240, applications or the like stored in the memory 330 of the computing platform 302.

Processor device(s) 320 may include various processing subsystems (not shown in FIG. 3) embodied in hardware, firmware, software, and combinations thereof, which enable the functionality of the computing platform and the operability of the computing platform on a distributed computing network. For example, processing subsystems allow for initiating and maintaining communications and exchanging data with other networked devices. For the disclosed aspects, processing subsystems of processor device 320 may include any subsystem used in conjunction with instructions 230 and/or 240 and applications stored thereon.

Computing platform 302 may additionally include a communications mechanism (not shown in FIG. 3) embodied in hardware, firmware, software, and combinations thereof, that enables electronic communications, internally, between the one or more components of the computing platform 302 and, externally, between the mobile communication device 300 and other networks and devices. Thus, the communication mechanism may include the requisite hardware, firmware, software and/or combinations thereof for establishing and maintaining a wired and/or wireless network communication connection.

Further, the computing platform 302 includes short-range wireless receiver 310, such as a NFC reader or the like that is configured to, in response to the mobile communication device 300 being within a prescribed near-field distance/range of the short-range wireless tag/chip 210, read the first instructions 230 configured to, at least one of (i) request 232 electronic processing of the resource distribution and/or (ii) complete 234 electronic processing of the resource distribution and, in optional embodiments of the invention read the second instructions 240 configured to, at least one of, (i) request 242 subsequent resource distribution requests occur electronically (i.e., without issuing a physical resource distribution request document) and/or (ii) complete 244 subsequent resource distributions electronically and automatically.

The processing device 320 is configured to execute the instructions 230 and/or 240. In specific embodiments of the invention, the processor 320 is configured to perform actions 360 to request and/or complete the resource distributions and/or request and/or complete subsequent resource distributions between the resource provider and resource requester. In those embodiments of the invention in which the first instructions 230 are configured to request 232 electronic processing of the resource distribution, the processor 320 may be configured load the resource distribution request 342 in a resource distribution application 340 or in an online portal/website (not shown in FIG. 3). In addition the processor 320 may be configured to generate and communicate an alert 370 to the resource provider that notifies the resource provider that the resource distribution request 342 has been loaded in the resource distribution application 340. Once loaded in the resource distribution application, the resource provider may authorize completion of the electronic resource distribution. In specific embodiments of the invention, in which the document 200 is a hard-copy bill of payment, the processor 320 may be configured load a payment request 342 in a digital wallet/bill payment application 340 or in an online portal/financial institution website. In addition, the processor 320 may be configured to generate and communicate an alert 370 to the payee that notifies the payee that the payment request 342 has been loaded in the digital wallet/bill payment application 340 and/or online porta/financial institution website. Once loaded in the digital wallet/bill pay application, the payee may authorize completion of the electronic payment, which may occur via any known or future known electronic payment method, such as, but not limited to, P2P, RTP network and the like.

In those embodiments of the invention in which the first instructions 230 are configured to complete 234 electronic processing of the resource distribution, the processor 320 may be configured launch resource distribution application 350 and execute 352 the resource distribution. While FIG. 3 shows resource distribution applications 340 and 350 as separate applications, in specific embodiments of the invention, the functions of applications may be embodied in one consolidated resource distribution application. In addition the processor 320 may be configured to generate and communicate an alert 370 to the resource provider that notifies the resource provider that the resource distribution has been executed. In specific embodiments of the invention, in which the document 200 is a hard-copy bill of payment, the processor 320 may be configured launch a payment application 350 (e.g., P2P, RTP network payment or the like) and execute/complete 352 the payment transaction. In addition, the processor 320 may be configured to generate and communicate an alert 370 to the payee that notifies the payee that the payment transaction has been executed/completed.

In those embodiments of the invention in which the second instructions 240 are configured to electronically request 242 subsequent resource distribution, the processor 320 may be configured load the subsequent resource distribution request 344 in a resource distribution application 340 or in an online portal/website (not shown in FIG. 3). In addition the processor 320 may be configured to generate and communicate an alert 370 to the resource provider that notifies the resource provider that the subsequent resource distribution request 344 has been loaded in the resource distribution application 340. Once loaded in the resource distribution application 340, the resource provider may authorize completion of the subsequent resource distribution. In specific embodiments of the invention, in which the document 200 is a hard-copy bill of payment, the processor 320 may be configured load a subsequent payment request 352 in a digital wallet/bill payment application 340 or in an online portal/financial institution website. In addition, the processor 320 may be configured to generate and communicate an alert 370 to the payee that notifies the payee that the subsequent payment request 352 has been loaded in the digital wallet/bill payment application 340 and/or online porta/financial institution website. Once loaded in the digital wallet/bill pay application, the payee may authorize completion of the electronic payment of the subsequent payment request 352, which may occur via any known or future known electronic payment method, such as, but not limited to, P2P, RTP network and the like.

In those embodiments of the invention in which the second instructions 240 are configured to complete 234 subsequent resource distributions, the processor 320 may be configured launch resource distribution application 350 and execute 354 the subsequent resource distribution. In addition the processor 320 may be configured to generate and communicate an alert 370 to the resource provider that notifies the resource provider that the subsequent resource distribution has been executed. In specific embodiments of the invention, in which the document 200 is a hard-copy bill of payment, the processor 320 may be configured launch a payment application 350 (e.g., P2P, RTP network payment or the like) and execute/complete 354 the subsequent payment transaction between the payor and the payee. In addition, the processor 320 may be configured to generate and communicate an alert 370 to the payee that notifies the payee that the subsequent payment transaction has been executed/completed.

Referring to FIG. 4 a flow diagram is depicted of a method 400 for facilitating resource distribution, in accordance with embodiments of the present invention. At Event 410, an short-range wireless tag/chip is embedded within a physical resource distribution request document that includes indicia configured to request a resource distribution. In specific embodiments of the method, an short-range wireless tag/chip is embedded within a physical bill that includes human-readable indicia for requesting a payment.

At Event 420, first instructions are stored on the short-range wireless tag/chip that are configured to, at least one of, request electronic processing of the resource distribution or complete electronic processing of the resource distribution. In specific embodiments of the method the first instructions are configured to, at least one of, request electronic payment or conduct/complete electronic payment. In alternate embodiments of the method, at Event 430, second instructions are stored on the short-range wireless tag/chip that are configured to, at least one of, (i) request subsequent resource distributions electronically (i.e., absent the issuance of a physical resource distribution request document) and/or (ii) complete subsequent resource distributions automatically and electronically.

At Event 440, in response to the short-range wireless tag/chip being within a prescribed distance/range of an short-range wireless receiver on a mobile communication device, the first instructions and, optionally if stored on the tag, the second instructions are read. At Event 450, in response to the short-range wireless receiver reading the first instructions for completing the resource distribution, an application on the mobile communication device is launched and the resource distribution is completed. In specific embodiments of the method, in response to the short-range wireless receiver the first instructions for completing a payment transaction, an auto-pay application on the mobile communication device is launched and the payment transaction is completed.

At Event 460, in response to the short-range wireless receiver reading the first instructions for requesting the resource distribution, the request for resource distribution is loaded in an application on the mobile communication device and/or in an online portal. In specific embodiments of the method, in response to the short-range wireless receiver the first instructions for requesting a payment transaction, the payment request is loaded in a digital wallet/bill pay application and/or within an online portal/financial institution website or the like.

At Event 470, in the event that the method includes second instructions, actions are performed for requesting and/or completing subsequent resource distributions between the resource provider and the resource recipient.

Referring to FIG. 5 a block diagram is presented of system 500 for facilitating resource distribution, in accordance with embodiments of the present invention. The system includes a physical resource distribution document/instrument 600 having indicia thereon that authorizes a resource distribution from a resource provider to a resource recipient. In specific embodiments of the invention, the physical resource distribution document/instrument 600 is a financial institution check (e.g., personal or financial institution-issued) or other physical document that authorizes payment from a payor to a payee.

The system additionally includes a data storage/access mechanism 610 that is disposed on or embedded within the physical resource distribution document/instrument 600. The data storage/access mechanism 610 stores or provides network-access to instructions configured to, at least one of, (i) request electronic processing of the subsequent resource distributions between the resource provider and the resource recipient and/or (ii) complete electronic processing of subsequent resource distributions between the resource provider and the resource recipient. In those embodiments of the invention, in which the resource distribution document/instrument 600 is a personal or financial institution check or the like, the instructions include the details of the check, such as a payor identifier, payor account identifier, routing number and the like. In such embodiments of the invention, instructions configured to request electronic processing of subsequent resource distribution may include instructions configured to load subsequent payment requests in a mobile wallet/banking application or online portal/online banking site. In further such embodiments of the invention, instructions configured to complete electronic processing of subsequent resource distribution may include instructions configured to launch an automatic bill pay application and automatically complete/conduct a payment transaction. The payment transaction may be P2P transaction, a RTP network transaction (e.g., a transaction that is completed and settled in real-time) or any other known or future known payment transaction).

Additionally, the system includes a mobile communication device 300 including a data receiver mechanism 380 configured to receive or provide network-access to the instructions configured to, at least one of, (i) request electronic processing of the subsequent resource distributions between the resource provider and the resource recipient and/or (ii) complete electronic processing of subsequent resource distributions between the resource provider and the resource recipient. Additionally, in specific embodiments of the system, the mobile communication includes a processor device (shown in FIG. 9) configured to, in response to receiving or accessing the instructions, execute the instructions to configure electronic requesting of subsequent resource distributions and/or automatic electronic processing of subsequent resource distributions. In those embodiments of the system in which the resource distribution document/instrument 600 is a personal or financial institution check executing the instructions to request bill payment may include loading a payment request for subsequent payments in a digital wallet/banking application and/or within an online portal/financial institution website having a bill pay feature or the like. In other related embodiments of the system, executing the instructions to complete bill payment may include launching a payment application in the mobile communication device and, in some embodiments, automatically conducting/completing a payment transaction for the subsequent payment. As previously discussed, the payment transaction may be P2P transaction, a RTP network transaction (e.g., a transaction that is completed and settled in real-time) or any other known or future known payment transaction).

Referring to FIGS. 6 and 7 block diagrams are depicted of alternative systems 500 for facilitating resource distribution, in accordance with embodiments of the present invention. Specifically, in the system 500 of FIG. 6 the data storage/access mechanism 600, described in relation to the embodiments of FIG. 5, comprises a short-range wireless tag/chip 610-A, such as a Near-Field Communication (NFC) tag/chip embedded in the resource distribution document/instrument 600. The short-range wireless tag/chip 610A stores the instructions configured to, at least one of, (i) request electronic processing of the subsequent resource distributions between the resource provider and the resource recipient and/or (ii) complete electronic processing of subsequent resource distributions between the resource provider and the resource recipient. In such embodiments of the system 500, the data receiver mechanism 380, described in relation to FIG. 5 comprises a short-range wireless receiver 380-A, such as a NFC reader or the like configured to read the contents of the short-range wireless tag/chip 610-A when the short-range wireless receiver 380-A is within a prescribed near field distance/range of the short-range wireless tag/chip 610-A.

In the system 500 of FIG. 7 the data storage/access mechanism 600, described in relation to the embodiments of FIG. 5, comprises computer-readable indicia 610-B, such as, but not limited to, a Quick Response (QR) code, or other two dimensional barcodes or the like. The computer-readable indicia 610-A—is configured to store or provide network access to the instructions configured to, at least one of, (i) request electronic processing of the subsequent resource distributions between the resource provider and the resource recipient and/or (ii) complete electronic processing of subsequent resource distributions between the resource provider and the resource recipient. In such embodiments of the invention, the mobile communication device 300 includes an image-capturing device 380-B (e.g., camera or the like) configured to capture an image if the computer-readable indicia 610-B.

Referring to FIG. 8 a more detailed block diagram is presented of a physical resource document/instrument 600, in accordance with embodiments of the invention. The physical resource distribution document/instrument 600, which in specific embodiments of the invention may comprise a personal or financial institution check or the like configured to authorize a resource distribution between a resource provider and a resource recipient. As such, the resource distribution document 600 includes resource provider credentials 640, including but not limited to, a resource provider identifier, a repository location and the like. As previously discussed in relation to FIG. 5, the physical resource distribution document/instrument 600 includes a data storage/access mechanism 610 which may comprise an short-range wireless tag/chip 610-A, computer-readable indicia 610-B or the like.

The data storage/access mechanism 610 may be configured to stores instructions 620 configured to, at least one of, (i) request 622 electronic processing of the subsequent resource distributions and/or (ii) complete 624 electronic processing of the subsequent resource distribution. In addition, the instructions 620 may include the resource provider credentials 640 disposed on the face of the resource distribution document 600. In other embodiments of the invention, the data storage/access mechanism 610 may be configured to provide network-access 626 to the instructions 620 or application-access 626 to the instructions 620 (e.g., a computer-readable indicia comprises a link to a network site or is configured to launch an application). In those embodiments of the invention, in which the resource distribution document 600 is a personal or financial institution check or the like, the resource provider credentials 640 may include a payor name, a routing number, an account number and the like. In those embodiments of the invention in which the instructions 620 are configured to request 622 electronic processing of subsequent resource distributions and the document 620 is a check, the instructions 620 may be configured to load a payment request for the associated bill in a mobile wallet/banking application or online portal/online banking site. In those embodiments of the invention in which the first instructions 620 are configured to complete 624 electronic processing of subsequent resource distribution, the instructions 620 may be configured to launch a bill pay application that automates the completion of a payment transaction. The bill pay application may be configured to conduct a P2P transaction, an RTP network transaction or the like.

FIG. 9 provides a block diagram of a mobile communication device 300 configured for facilitating resource distribution, in accordance with embodiments of the invention. The mobile communication device 300 includes a computing platform 302 configured to execute programs, applications, modules and the like. The computing platform 302 includes memory 330, which may comprise volatile and non-volatile memory, such as read-only and/or random-access memory (RAM and ROM), EPROM, EEPROM, flash cards, or any memory common to computer platforms). Moreover, memory 330 may comprise cloud storage accessible to the mobile communication device 300, such as provided by a cloud storage service and/or a cloud connection service.

Further, computing platform 302 also includes one or more processor devices 320, which may be an application-specific integrated circuit ("ASIC"), or other chipset, logic circuit, or other data processing device. Processor device 320 may execute an application programming interface ("API") (not shown in FIG. 9) that interfaces with any resident instructions, such as instructions 620, applications or the like stored in the memory 330 of the computing platform 302.

Processor device(s) 320 may include various processing subsystems (not shown in FIG. 9) embodied in hardware, firmware, software, and combinations thereof, which enable the functionality of the computing platform and the operability of the computing platform on a distributed computing network. For example, processing subsystems allow for initiating and maintaining communications and exchanging data with other networked devices. For the disclosed aspects, processing subsystems of processor device 320 may include any subsystem used in conjunction with instructions 620 and applications stored thereon.

Computing platform 302 may additionally include a communications mechanism (not shown in FIG. 9) embodied in hardware, firmware, software, and combinations thereof, that enables electronic communications, internally, between the one or more components of the computing platform 302 and, externally, between the mobile communication device 300 and other networks and devices. Thus, the communication mechanism may include the requisite hardware, firmware, software and/or combinations thereof for establishing and maintaining a wired and/or wireless network communication connection.

Further, the computing platform 302 includes a data receiver mechanism 380, which in specific embodiments of the invention may comprise a short-range wireless receiver 380-A or an image capturing device 380-B that either capture/receive instructions 620 or provide access network 626 or application 628 access to the instructions 620. The short-range wireless receiver 380-A is configured to, in response to the mobile communication device 300 being within a prescribed near-field distance/range of the short-range wireless tag/chip 610-A, read the instructions 620 configured to, at least one of (i) request 622 electronic processing of subsequent resource distributions between the resource provider and resource recipient and/or (ii) complete 624 electronic processing of subsequent resource distributions between the resource provider and resource recipient (i.e., without issuing a physical resource distribution request document). The image capturing device 380-B is configured to capture an image of the computer-readable indicia 610-B that includes or proves network 626 or application 628 access to the instructions 620 configured to, at least one of (i) request 622 electronic processing of subsequent resource distributions between the resource provider and resource recipient and/or (ii) complete 624 electronic processing of subsequent resource distributions between the resource provider and resource recipient.

The processing device 320 is configured to identify and execute 380 the instructions 620 and/or access the designated network site or application 390 to retrieve and execute the instructions 620. In specific embodiments of the invention, the processor 320 is configured to execute actions to request and/or complete subsequent resource distributions between the resource provider and resource requester. In those embodiments of the invention in which the instructions 620 are configured to request 622 electronic processing of subsequent resource distributions, the processor 320 may be configured load the resource distribution request 394 in a resource distribution application 340 and/or in an online portal/website (not shown in FIG. 9). In addition the processor 320 may be configured to generate and communicate an alert to the resource provider that notifies the resource provider that the resource distribution request has been loaded in the resource distribution application 340. Once loaded in the resource distribution application 340, the resource provider may authorize completion of the electronic resource distribution. In specific embodiments of the invention, in which the document 600 is a personal or financial institution check, the processor 320 may be configured load a payment request 394 in a digital wallet/bill payment application 340 or in an online portal/financial institution website. In addition, the processor 320 may be configured to generate and communicate an alert to the payee that notifies the payee that the payment request for the subsequent payment has been loaded in the digital wallet/bill payment application 340 and/or online porta/financial institution website. Once loaded in the digital wallet/bill pay application, the payee may authorize completion of the electronic payment, which may occur via any known or future known electronic payment method, such as, but not limited to, P2P, RTP network and the like.

In those embodiments of the invention in which the instructions 620 are configured to complete 626 electronic processing of the resource distribution, the processor 320 may be configured launch resource distribution application 350 and complete/conduct electronic processing 392 of the resource distribution. While FIG. 9 shows resource distribution applications 340 and 350 as separate applications, in specific embodiments of the invention, the functions of applications may be embodied in one consolidated resource distribution application. In addition the processor 320 may be configured to generate and communicate an alert to the resource provider that notifies the resource provider that the subsequent resource distribution has been executed. In specific embodiments of the invention, in which the document 600 is a personal or financial institution check, the processor 320 may be configured launch a payment application 350 (e.g., P2P, RTP network payment or the like) and execute/complete 392 the payment transaction. In addition, the processor 320 may be configured to generate and communicate an alert to the payee that notifies the payee that the payment transaction has been executed/completed. RTP processing 628 of the resource distribution provides for the distribution to be completed and settled in real-time using the resource provider credentials 640 included in the instructions 620 or included on the face of the document 600.

Referring to FIG. 10 a flow diagram is depicted of a method 700 for facilitating resource distribution, in accordance with embodiments of the present invention. At Event 710, a data storage/access mechanism is disposed on a physical resource distribution document that includes indicia authorizes a resource distribution between a resource provider and a resource recipient. In specific embodiments of the method, the data storage/access mechanism is a short-range wireless tag/chip, such as a NFC chip/tag or the like embedded within the resource distribution document, while in other embodiments of the method, the data storage/access mechanism is computer-readable indicia located on the document. In other specific embodiments of the invention, the resource distribution document is a personal or financial institution check that authorizes payment from a payor to a payee.

At Event 720, instructions are stored or accessible through the data storage/access mechanism. The instructions are configured to, at least one of, request electronic processing of subsequent resource distribution or complete electronic processing of the subsequent resource distribution. In specific embodiments of the method the instructions are configured to, at least one of, request electronic payment of subsequent payment requests from the payee to the payor or conduct/complete electronic payment of subsequent request.

At Event 730, in response to the mobile communication device receiving the instructions, subsequent resource distribution requests are made electronically and/or the resource distribution is processed, in some embodiments, automatically upon receipt, electronically.

Thus, present embodiments of the invention, including systems, apparatus, methods and/or the like, provide for facilitating an electronic resource distribution by embedding a Near-Field Communication (NFC) tag in a resource distribution request that stores instructions for processing the resource distribution in a fully electronic manner. As such, the resource distribution request holder is capable of processing the request without issuing a resource distribution document to the resource requester. In additional embodiments of the invention, the short-range wireless tag/chip further stores instructions for arranging subsequent resource distributions to the resource requester to occur without the need for the resource requester to present a resource request document. As such the present invention eliminates the need for a resource provider to issue a physical resource distribution document/instrument and/or the need for the resource requester to present a resource distribution request for future resource distributions between the resource requester and resource provider.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| To be assigned | SYSTEM FOR SECURE CONTACTLESS DISTRIBUTION OF DYNAMIC RESOURCES | Concurrently herewith |
| To be assigned | RESOURCE DISTRIBUTION HUB GENERATION ON A MOBILE DEVICE | Concurrently herewith |
| To be assigned | SYSTEM FOR SECONDARY AUTHENTICATION VIA CONTACTLESS DISTRIBUTION OF DYNAMIC RESOURCES | Concurrently herewith |
| To be assigned | RESOURCE DISTRIBUTION INSTRUMENTS WITH EMBEDDED CODES OR COMMUNICATION DEVICES | Concurrently herewith |

What is claimed is:

1. A system for facilitating resource distribution, the system comprising:
  a physical document having indicia configured to request a resource distribution;
  a short-range wireless tag embedded within the physical document and storing first instructions configured for at least one of requesting electronic processing of the resource distribution or completing electronic processing of the resource distribution, wherein the first instructions include a request identifier, requesting party identifier, and a resource distribution amount; and
  a mobile communication device including a memory, a processor in communication with the memory and a short-range wireless receiver in communication with the processor and configured to, in response to the mobile communication device being within a prescribed near-field distance of the short-range wireless tag, (i) read the first instructions for at least one of requesting electronic processing of the resource distribution or completing electronic processing of the resource distribution, and (ii) launch a mobile application on the mobile application device and load the request in the mobile application including loading the resource distribution amount and at least one of the request identifier and the requesting party identifier.

2. The system of claim 1, wherein the processor is configured to, in response to the short-range wireless receiver reading the first instructions for completing electronic processing of the resource distribution, (iii) in response to loading the request, automatically initiate and complete electronic processing of the resource distribution.

3. The system of claim 2, wherein the processor is configured to, in response to the short-range wireless receiver reading the first instructions for completing electronic processing of the resource distribution, generate and provide an alert to the mobile communication device that is configured to notify the user of the automatic initiation and completion of the electronic processing of the resource distribution.

4. The system of claim 1, wherein the processor is further configured to generate and provide an alert to the mobile communication device that is configured to notify the user that the request for electronic processing of the resource distribution is loaded in the mobile application.

5. The system of claim 1, wherein the short-range wireless tag stores second instructions for configured to arrange subsequent requests for resource distribution to occur absent issuance of a physical document requesting resource distribution.

6. The system of claim 5, wherein the short-range wireless receiver is configured to, in response to the mobile communication device being within a prescribed near-field distance of the short-range wireless tag, read the second instructions configured to arrange subsequent requests for resource distribution to occur absent issuance of the physical document requesting resource distribution and wherein the processor is configured to generate and provide an alert to the user that includes information for arranging the subsequent requests for resource distribution to occur in a fully electronic manner.

7. The system of claim 1, wherein the short-range wireless tag stores second instructions for configuring subsequent requests for resource distribution to occur automatically via fully electronic processing.

8. The system of claim 7, wherein the short-range wireless receiver is configured to, in response to the mobile communication device being within a prescribed near-field distance of the short-range wireless tag, read the second instructions for configuring subsequent requests for resource distribution to occur automatically via fully electronic processing and wherein the processor is configured to perform actions for setting up automatic resource distribution for subsequent requests for resource distribution.

9. An apparatus for facilitating resource distribution, the apparatus comprising:
a physical document having indicia configured to request a resource distribution; and
a Near-Field Communication (NFC) tag embedded within the physical document storing first instructions configured for at least one of requesting electronic processing of the resource distribution or completing electronic processing of the resource distribution, wherein the first instructions include a request identifier, requesting party identifier, and a resource distribution amount.

10. The apparatus of claim 9, wherein the short-range wireless tag stores second instructions for requesting that a user of the mobile communication device arrange subsequent requests for resource distribution to occur absent issuance of a physical document requesting resource distribution.

11. The apparatus of claim 9, wherein the short-range wireless tag stores second instructions for store second instructions for configuring subsequent requests for resource distribution to occur automatically via fully electronic processing.

12. A method for facilitating resource distribution, the method comprising:
embedding a short-range wireless tag in a physical document having indicia configured to request a resource distribution;
storing on the short-range wireless tag first instructions configured to, at least one of, request electronic processing of the resource distribution or complete electronic processing of the resource distribution, wherein the first instructions include a request identifier, requesting party identifier, and a resource distribution amount; and
in response to the short-range wireless tag being within a prescribed near-field distance to an short-range wireless receiver within a mobile communication device, (i) reading the first instructions for at least one of requesting electronic processing of the resource distribution or completing electronic processing of the resource distribution, and (ii) launching a mobile application on the mobile application device and loading the request in the mobile application including loading the resource distribution amount and at least one of the request identifier and the requesting party identifier.

13. The method of claim 12, further comprising, in response to the short-range wireless receiver reading the first instructions for completing electronic processing of the resource distribution, (iii) in response to loading the request, automatically initiating and completing electronic processing of the resource distribution.

14. The method of claim 13, further comprising, in response to the short-range wireless receiver reading the first instructions for completing electronic processing of the resource distribution, generating and providing, by a computing device processor in the mobile communication device, an alert to the mobile communication device that is configured to notify the user of the automatic initiation and completion of the electronic processing of the resource distribution.

15. The method of claim 12, further comprising, in response to the short-range wireless receiver reading the instructions for requesting electronic processing of the resource distribution, generating and providing, by the computing device processor, an alert to the mobile communication device that is configured to notify the user that the request for electronic processing of the resource distribution is loaded in the mobile application.

16. The method of claim 12, wherein storing further comprises storing on the short-range wireless tag second instructions for requesting that a user of the mobile communication device arrange subsequent requests for resource distribution to occur absent issuance of a physical document requesting resource distribution.

17. The method of claim 16, further comprising:
in response to the mobile communication device being within the prescribed near-field distance of the short-range wireless tag, reading, by the short-range wireless receiver, the second instructions for requesting that the user of the mobile communication device arrange subsequent requests for resource distribution to occur absent issuance of a physical document requesting resource distribution;

generating and providing, by a computing device processor in the mobile communication device, an alert to the user that includes information for arranging the subsequent requests for resource distribution to occur absent issuance of a physical document requesting resource distribution.

18. The method of claim 12, wherein further comprises storing on the short-range wireless tag second instructions for configuring subsequent requests for resource distribution to occur automatically via fully electronic processing.

19. The method of claim 18, further comprising:

in response to the mobile communication device being within a prescribed near-field distance of the short-range wireless tag, reading, by the short-range wireless receiver, the second instructions for configuring subsequent requests for resource distribution to occur automatically via fully electronic processing; and performing, by a computing device processor in the mobile communication device, actions for setting up automatic resource distribution for subsequent requests for resource distribution.

\* \* \* \* \*